Patented Feb. 6, 1951

2,540,705

UNITED STATES PATENT OFFICE 2,540,705

MODIFIED AZO DYESTUFFS

Paul Arthur, Jr., Wilmington, Del., assignor to E. I. du Pont de Nemours & Company, Wilmington, Del., a corporation of Delaware No Drawing. Application October 29, 1946,
Serial No. 706,521

17 Claims. (Cl. 260—208)

This invention relates to dyestuffs and more particularly to modified azo dyestuffs, generally of the pigment dyestuff class, and to a method for modifying such dyestuffs to produce deepened shades and reduced bleeding tendencies.

It is well known that organic compounds containing an azo group have been used as pigments. However, it has been found that an objectionable characteristic of this group, designated as the azo pigment dyestuffs, is that they tend to migrate in organic films and to dissolve in organic solvents, thus leading to the phenomenon known as bleeding. This disadvantage is particularly evident upon baking overstriped films containing the pigments. This characteristic is also shown, but less frequently and usually to a lesser degree, by that group known as the precipitated azo pigments. This disadvantage greatly limits the usefulness of a large number of azo dyestuffs. The bleeding problem has been approached from many angles but no general method of reducing the bleeding tendencies shown by azo dyestuffs in organic films has heretofore been known to the art.

Other problems encountered in the use of the simpler azo dyestuffs include a tendency towards retardation of the setting up of drying oils and a volatility evidenced particularly at higher baking temperatures. Furthermore, the low color strength of simpler aromatic azo compounds precludes their use advantageously as pigments. The production of deeper shades, particularly maroons and purples, has heretofore usually necessitated the manufacture of difficultly accessible intermediates.

It is an object of this invention to provide a process for modifying azo dyestuffs to produce more useful products. A further object is to provide a process for producing deepened shades in azo dyestuffs. A still further object is to provide a method for reducing the bleeding tendencies shown by azo dyestuffs in organic films. Another object is to provide modified azo dyestuffs of deepened shades and having reduced bleeding tendencies. An additional object is to provide a method for eliminating the inhibiting action of the simpler azo dyes upon the setting up of drying oils. Still another object is to provide modified azo pigments of deeper shades, such as maroons and purples. Other objects will appear hereinafter.

These objects are accomplished by the following invention of modified azo dyestuffs and a process for preparing them which comprises treating in the presence of strong sulfuric acid as a condensing agent an azo dyestuff containing at least one aromatic nucleus which has at least one nuclear hydrogen and is substituted with at least one azo and one hydroxyl group with a member of the class consisting of formaldehyde and formaldehyde generators. The reaction mass is subsequently drowned in water which terminates the reaction and precipitates the dyestuff.

In the preferred embodiment of this invention, the azo dyestuff which contains at least one aromatic nucleus which has at least one nuclear hydrogen, and one azo and one hydroxyl substituent is dissolved or suspended in concentrated sulfuric acid at 10° to 50° C. The dyestuff/sulfuric acid composition is then brought into contact with the formaldehyde in any convenient form, such as paraformaldehyde in sulfuric acid solution. It has also been found practical to reverse this order of addition. Any acid resistant vessel equipped with an agitator can be used for carrying out the reaction. It is preferable to have some fume control attachment where volatile forms of formaldehyde or formaldehyde generators are used.

The reaction is allowed to proceed for three minutes to four hours, but preferably for not more than 30 minutes, and the reaction mass is then drowned in water. Drowning consists of rapidly mixing the acid solution with sufficient water so as to stop the reaction, to destroy the solvent power of the acid and to precipitate the dyestuff in a fine state of subdivision. It is desirable to use a volume of water at least twice that of the acidic solution. With a ratio of 7 to 10 volumes of water to 1 volume of solution, a rise in temperature of about 20 to 30° C. accompanies the drowning process. The product is washed free of acid and can be isolated as the wet pulp or can be dried to yield a solid product.

It is desirable that the product be washed acid free, particularly if a dry dyestuff is to be obtained. Otherwise upon removal of water, the concentration of acid is increased to a point where it tends to partially redissolve the finely divided product and to so change the physical form of the product that it loses tinctorial strength. In addition the presence of acid in the pigment has a deleterious effect on many pigment vehicles.

The mono-, dis-, and polyazo dyestuffs containing at least one aromatic nucleus which has at least one nuclear hydrogen and is substituted with at least one azo and one hydroxyl group are included within this invention. However the parent mono- and disazo compounds are preferred because of the greater ease of preparation, greater commercial availability and lower cost than the more complex polyazo dyestuffs. Some examples of monoazo dyestuffs are 1-(2-nitro-p-tolylazo)-2-naphthol, 4-(p-nitrophenylazo)resorcinol, and 1-(2-methyl-5-nitrophenylazo)-2-hydroxy-3-naphthanilide. A common disazo dyestuff is 1-[4-(o-tolylazo)-o-tolylazo]-2-naphthol. An example of a polyazo dyestuff is 1-hydroxy-2[3(2,4-dihydroxy-phenylazo) phenylazo]-6-(2,4-dihydroxy-phenylazo)-3-naphthalene-sulfonic acid sodium salt.

The pigment dyestuffs and precipitated azo colors containing a beta-naphthol nucleus in their structure, such as those derived from a 2-hydroxy-3-naphthoic acid, or 2-hydroxy-3-naphtharylides, or beta-naphthol, are particularly susceptible to the conditions of the process of this invention but are entirely unaffected by the conditions used in after-treating dyed fibers colored with azo dyestuffs derived from resorcinol as described in the prior art. These classes of dyestuffs are preferred as reactants in this invention because of their inherent resistance to deteriorating influences. However, the invention is not limited to this preferred group since startling improvement may be made in organic compounds for pigment purposes, particularly in cases such as azoxybenzene which normally are not even considered pigments. In addition, the so-called oil-soluble colors, such as 1-[4-(o-tolylazo)-o-tolylazo]-2-naphthol, are improved through a marked reduction in their bleeding tendency and an elimination of their inhibiting action upon the drying of linseed oil vehicles.

The ordinary concentrated sulfuric acid of commerce containing 96% sulfuric acid is quite suitable for use in this invention. Strong sulfuric acid of at least 80% concentration should be used in this invention. Inert diluents may be added to the reaction mixture but in general the addition of polar organic materials tends to inhibit the reaction unless these polar organic materials are themselves the modifying agents. Excessive dilution of the sulfuric acid with water or acetic acid inhibits the reaction. It is preferred that the reaction medium not contain more than 25% polar solvent by weight.

Paraformaldehyde has been found to be the most convenient form of formaldehyde to use since it is relatively free of odor, easily handled and dissolves in sulfuric acid without heat effects. However the formaldehyde may be added in other forms including formalin, formals, methylene diesters, methylol derivatives, and methylol ethers. The addition of the preferred modifying agent, paraformaldehyde, to sulfuric acid results in no readily detectable heat effects whereas the addition of formalin to sulfuric acid produces marked heat effects.

Modification with formaldehyde according to the process of this invention results in a deepening of the shade of the pigment which is proportional to the amount of formaldehyde or formaldehyde generator added up to approximately 1 mole of formaldehyde per mole of pigment beyond which further additions of formaldehyde generator are practically without effect upon the shade of color obtained. At least 0.5 mole of formaldehyde or its equivalent per mole of pigment should be added to obtain a practical reduction in the bleeding tendency of the pigment. However excessive amounts of formaldehyde should be avoided since this increases the bleeding tendency. In general no more than 5 moles and preferably not more than 2 moles of formaldehyde per mole of dyestuff should be used. The amount used within these limits will of course depend upon the particular dyestuff being treated. For optimum results about 1.2 moles of formaldehyde per mole of dyestuff should be used.

The temperature should be chosen so that it is high enough to permit ready solution of the dyestuff and to give a mobile, easily handled mixture but should not be so high as to cause the sulfuric acid itself to modify the dyestuff. In practice it has been found that the range of 10° to 50° C., and preferably 15° to 35° C., is most convenient and practical for ordinary purposes. The reaction occurs with surprising speed and rapidity at normal room temperature so there is no necessity of using extreme temperatures during the reaction period. In fact, the use of high temperatures is in general to be avoided since high temperatures favor side reactions such as hydrolysis, sulfonation, and decarboxylation which normally do not occur in the temperature range 10° to 50° C.

The dyestuff tends to become more bleed resistant as the reaction time is increased provided the necessary minimum amount of formaldehyde generator is present. However, concurrent with this effect the solution tends to become more viscous and the sulfuric acid itself tends to modify the dyestuff in an undesirable manner. The reaction time can be shortened by decreasing the ratio of dyestuff to formaldehyde, that is by increasing the amount of formaldehyde present. This procedure also tends to lessen the tendency of the solutions to become more viscous and gel but on the other hand leads to an excess of unreacted formaldehyde which increases the cost of the process.

Adjuvant agents to prevent gelation of the reaction mixture or to help produce particularly desirable products can be used. Adjuvant agents preferred for use are phenolic compounds having at least one —Z=O type substituent in the same aromatic ring as the hydroxyl group, where Z represents nitrogen, carbon or sulfur and can be tri-, tetra-, penta-, or hexa-valent. Thus, the —Z=O type substituent includes among others the nitro group, the sulfone group, the ketone group, the ester group, and the nitroso group. Examples of such adjuvant agents are 2-hydroxy-3-naphtho-o-toluide, salicylanilide, p,p'-dihydroxydiphenylsulfone, p-hydroxybenzophenone, phenyl salicylate, 2,4-dinitrophenol, and p-nitrosophenol.

This invention is further illustrated by the following examples in which the quantities are given as parts by weight unless otherwise specified.

*Example I*

Fifty parts (1 mole) of an azo pigment dyestuff, 1-(2,5-dichlorophenylazo)-2-hydroxy-3-naphtho-o-toluide, is added to 1,470 parts of agitated 96% sulfuric acid over a 15-minute period. A very dark colored solution is formed. The temperature rises approximately 3° C. After 8.5 minutes additional stirring, a solution of 5.33 parts (1.6 moles) of paraformaldehyde dissolved in 69.7 parts of sulfuric acid is added to the dyestuff solution. The temperature rises approximately 6.7° C. Agitation is continued for 10 minutes and the solution is drowned in 6,000 parts of water 11 minutes after the paraformaldehyde addition. The precipitated dyestuff is isolated by vacuum filtration and the product washed successively with 100 parts and then 200 parts of water. The dyestuff is then reslurried in 800 parts of water for 10 minutes, isolated by vacuum filtration and washed repeatedly with 200 part-portions of water until the filtrate is less than 0.002 normal in acid content. The yield of modified pigment is 50–52 parts depending upon mechanical losses during filtration. A portion of the damp precipitate is dried under vacuum to provide a sample for testing the bleeding tendency and shade of the pigment.

An ink is prepared by mulling one part of pigment with two parts of varnish drier upon a ground glass plate. The ink, painted on a tin plate and overstriped with a white linseed oil paint showed essentially complete removal of the bleeding tendency upon being baked at 180° F. for 24 hours. A control ink made from untreated pigment and tested in like fashion bleeds strongly. The shade of the pigment is deepened by the treatment from a light red to a light maroon color.

Example II

In the case of certain pigments, most often those derived from the arylides of 2-hydroxy-3-naphthoic acid, it has been found that the reaction mixtures will gel if allowed to react for a sufficient length of time. This characteristic is illustrated by the following example:

Five parts (1 mole) of 1-(2,5-dichlorophenylazo)-2-hydroxy-3-naphtho-o-toluide is dissolved in 147 parts of agitated 96% sulfuric acid over a 9-minute period. A very dark colored solution is formed. The temperature rises approximately 1.9° C. After 2.5 minutes additional stirring, 0.73 parts (2.2 moles) of paraformaldehyde is added to the dyestuff solution. Within 30 seconds the temperature rises slightly more than 6.3° C. and after the reaction has been stirred approximately 3 minutes more, the solution gels. The gel is broken up and stirred into 1,000 parts of water 7.5 minutes after the formaldehyde addition. The water slurry is stirred for 18 minutes and then filtered. After three washings, each comprising 200 parts of water, the modified pigment is reslurried in 500 parts of water and stirred for 38 minutes. This slurry is then filtered and the precipitate washed with 200 part portions of water until the pH of the filtrate reaches 4.75. The wet pulp is then transferred to a vacuum drier where the water is removed. A yield of 5.27 parts of modified pigment is obtained.

Upon being mulled into varnish drier in the ratio of 2 parts of vehicle to 1 part of pigment, an ink is produced which is mounted on a metal panel in juxtaposition with a control ink made from the unmodified pigment, and baked for 15 hours at 180° F. The modified pigment shows no bleeding through an overstriped white linseed oil paint even after an additional 15-hour bake at 180° F., although the control ink made from the unmodified pigment bleeds strongly. The color of the modified pigment is light maroon in contrast to the light red color of the parent azo dyestuff.

Example III

It has been possible to avoid the gelation described in the previous example through the addition of certain adjuvants which may be typified by the 2-hydroxy-3-naphtho-o-toluide used in the following example:

Five parts (1 mole) of an azo pigment dyestuff, 1-(2,5-dichlorophenylazo)-2-hydroxy-3-naphtho-o-toluide, is added to 147 parts of agitated 96% sulfuric acid over a 6.5 minute period, thereby forming a dark colored solution. The temperature rises approximately 2.7° C. The solution is stirred 3.5 minutes and 0.68 part (2.05 moles) of solid paraformaldehyde is added. The temperature immediately begins to rise and after 30 seconds a solution of 6.31 g. of 2-hydroxy-3-naphtho-o-toluide dissolved in 92 parts of concentrated sulfuric acid is added. Within one minute after the addition of the paraformaldehyde the temperature rises 5.3° and five minutes later reaches a maximum rise of approximately 6.0° C. In contrast to the previous example, this solution neither becomes more viscous nor gels even though allowed to continue reacting for 9 minutes, a period three times longer than that which sufficed to cause gelation of an unmodified reaction. The reaction mixture at the end of the 9 minute reaction period is drowned in 1,000 parts of water. The precipitate is divided into two parts and each is washed 6 times with portions of water each of 200 parts. The combined precipitates are then reslurried in 500 parts of water and stirred for ½ hour. The slurry is filtered and washed with four portions of water, each of 100 parts. The wet pulp is transferred to a vacuum drier where the water is removed. A yield of 6.58 parts of a deep maroon modified pigment is obtained. When tested as in the previous example, the formaldehyde-modified pigment showed no detectable bleeding tendency.

Example IV

Fifty parts (1 mole) of an azo pigment dyestuff, 1-(2-methoxy-4-nitrophenylazo)-2-hydroxy-3-naphtho-o-toluide, is added to 1,470 parts of agitated concentrated sulfuric acid. A solution of deep purple color is formed. To this is added 9 parts (2.8 moles) of solid paraformaldehyde and the mixture is allowed to react for 28 minutes. It is then drowned in 10,000 parts of distilled water and filtered. The precipitate is reslurried in 6,000 parts of water, stirred for ½ hour and refiltered. The modified pigment is transferred to an oven maintained at 180° F. and the product is dried to constant weight. Sixty parts of modified pigment is obtained.

A dried ink made from 2 parts of varnish drier and 1 part of pigment showed no tendency to bleed through an over-stripe of a white linseed oil paint upon being baked for 15 hours. The modified pigment is deepened in shade from a rich maroon to a very dark purplish maroon pigment of exceptional covering power.

Example V

It has been found possible to check the gelling tendency of the reaction solutions by using a large excess of formaldehyde generator above that necessary to modify the pigment. This procedure is illustrated in the following example:

Five parts (1 mole) of an azo pigment dyestuff, 1-(2-methoxy-4-nitrophenylazo)-2-hydroxy-3-naphtho-o-toluide, is added to 147 parts of agitated 96% sulfuric acid over a 3 minute period. A very dark-colored solution is formed during which the temperature rises approximately 2.7° C. After 3 minutes additional stirring, 1.45 parts (4.4 moles) of solid paraformaldehyde is added whereupon the temperature rises very rapidly to about a maximum rise of 9.6° C. within 3 minutes. This reaction mixture is allowed to stand with occasional stirring at room temperature and shows no tendency toward increase in viscosity or gelation even after 24 hours.

Upon reducing the amount of paraformaldehyde but otherwise following a procedure similar to the above, the sulfuric acid solution of the dyestuff tends to gel within a short period. This is demonstrated by the following procedure: Five parts (1 mole) of an azo pigment dyestuff, 1 - (2 - methoxy-4-nitrophenylazo)-2-hydroxy-3-naphtho-o-toluide, is added to 147 parts of agitated 96% sulfuric acid over a 3 minute period. A very dark-colored solution is formed and the temperature rises approximately 2.9° C. After 3.5 minutes additional stirring 0.725 parts (2.2 moles) of solid paraformaldehyde is added and this results in a temperature rise of approximately 8.5° C. within 3 minutes after addition of the paraformaldehyde. The reaction mixture gels 8 minutes after the addition of paraformaldehyde. The products of both these procedures are non-bleeding, dark purplish-red pigments.

Example VI

Pigments of a precipitated azo class are also modified by treatment with formaldehyde generators in concentrated sulfuric acid solution. As is obvious to one skilled in the art, provision must be made for replacing the metallic iron which had normally been precipitated by the sulfuric acid solution.

Fifty parts (1 mole) of a precipitated azo dyestuff, 1-(5-chloro-4-methyl-2-sulfophenylazo)-2-hydroxy-3-napthoic acid mixed Ca-Ba salt, is added to 1,470 parts of agitated 96% sulfuric acid over a 15 minute period. A deep colored solution is formed and the temperature rises approximately 6.1° C. Agitation is continued for 2 minutes and 4.16 parts (0.95 mole) of paraformaldehyde is added. A temperature rise of approximately 1.1° C. results and the reaction mixture is stirred for 38 minutes and is then drowned in 6,000 parts of water. The precipitate is reslurried in 1,000 parts of 20% aqueous sodium chloride solution, refiltered and washed with 4 portions, each of 200 parts, of 20% aqueous sodium chloride solution. The modified pigment is then reslurried in 1,000 parts of water and 10 parts of calcium chloride is added to replace the metallic ion lost upon sulfuric acid treatment. The slurry is filtered and the precipitate washed with 2 portions of water, one of 200 parts and the other of 50 parts. The pulp of modified pigment obtained in this manner shows a markedly deeper red color than that of the unmodified control. Neither the unmodified control nor the formaldehyde-treated pigment shows a tendency to bleed when tested as in Example I.

Example VII

Five parts (1 mole) of 4-(p-nitrophenylazo)-resorcinol is added to 147 parts of agitated 96% sulfuric acid over a 3-minute period. A deep orange-red solution is formed and 0.636 part (1.1 moles) of paraformaldehyde are added. The reaction mixture is drowned in 1,000 parts of water 26 minutes after the formaldehyde addition. The product is isolated by filtration, washing and drying at 180° F.

The color of the modified pigment is a somewhat deeper red than that of the parent dyestuff but shows special advantages in that it does not inhibit the drying of the ink made with the varnish drier vehicle. In addition, the treated material though showing some bleeding, is very decidedly more bleed resistant than the parent dyestuff.

Example VIII

Compounds having azoxy groupings are rearranged under the reaction conditions to arylazophenols which readily undergo modification upon treatment with formaldehyde generators. This change is accompanied by remarkable increase in tinctorial strength as well as by a marked deepening in shade.

Five parts (1 mole) of azoxybenzene is added to 147 parts of agitated 96% sulfuric acid over a 3-minute period to form an orange-red solution. To this is added 0.832 part (1.1 moles) of paraformaldehyde and the whole is allowed to react for 20 minutes. The product is isolated by drowning the solution in 1,000 parts of water, filtering, washing and drying at 180° F. The treated pigment is dark brown in color and has high tinctorial strength in contrast to the almost transparent azoxybenzene. In addition, the formaldehyde-treated product shows no bleed even though the azoxybenzene before treatment exhibits a slight yellow bleed when tested as in Example I.

Example IX

Aqueous formaldehyde solutions may be used as the modifying agent for the pigment dissolved in concentrated sulfuric acid provided that sufficient dilution to inhibit the reaction does not result.

Five parts (1 mole) of an azo pigment dyestuff, 1 - (2,5 - dichlorophenylazo) - 2 - hydroxy - 3 - naphtho-o-toluide, is added to 147 parts of agitated 96% sulfuric acid over a 27.5 minute period to yield a very dark colored solution. To this is added 1.436 parts (1.6 moles) of formalin. The heat effect is much greater in this case than when an equivalent amount of solid paraformaldehyde is added. The reaction mixture is drowned in 1,000 parts of water 11 minutes after the addition of the formalin. The product is isolated by filtration, washing and drying at room temperature in a vacuum drier. By this process a maroon-colored pigment is produced, which is free from the bleeding tendency exhibited by the light red parent dyestuff when tested as in Example I.

It is not necessary to use formaldehyde as such, since formaldehyde generators, that is substances liberating formaldehyde, such as paraformaldehyde and the formals, for example methylal and dioxolane, are capable of modifying the pigment under the reaction conditions specified herein.

The reduction of bleeding is not a regular function of the amount of formaldehyde added to the reaction mixture. The bleeding tendency of pigments modified with an amount of formaldehyde somewhat less than that which yields a product showing a minimum amount of bleeding exhibit a bleeding tendency very markedly stronger than that of a control or of the preferred modified product.

The addition of water to the concentrated sulfuric acid solvent inhibits the modifying action of the formaldehyde. To obtain optimum results a highly concentrated sulfuric acid solution should be used. Since only small portions of paraformaldehyde are used in the modification of the pigments, the presence of large proportions of polar solvents, such as acetic acid, is found to have an inhibiting effect upon the modification reaction.

In carrying out the invention the immediate objective of the work is important in determining the exact procedure to be employed. For instance, it is possible starting with the same azo dyestuff, paraformaldehyde, and sulfuric acid to produce within limits only slight or complete reduction in bleeding tendency, an increase or decrease in the tinctorial strength, a difficultly or readily filterable product, and a slight or considerable change in shade. The reaction time is varied according to the object desired of the process in hand. The reaction period must also be determined by choice of conditions so as to obtain the desired objectives without excessive exposure of the dyestuff to the action of the concentrated sulfuric acid and to avoid the tendency of the acid to solubilize the product in water, thereby causing difficulties in the isolation. In general, the objective has been to produce a readily filterable, stable, non-bleeding modified azo dyestuff of reproducible shade.

The amount of dyestuff which is dissolved depends in large part on the molecular weight and substituents of the material. With the higher molecular weight azo dyestuffs of the 2-hydroxy-3-naphthoic acid anilide type, a concentration of 3.5% by weight generally gives mobile solutions which do not increase in viscosity to an excessive degree before the objectives of the reaction are accomplished. The more common lower molecular weight dyestuffs such as those derived by diazotizing and coupling a substituted aniline with beta-naphthol are more soluble and consequently higher concentrations may be made up without encountering mechanical difficulties. The effect of varying the reaction times and mole ratios of the reactants have been shown in the examples and will guide persons skilled in the art of dyestuff preparation to obtain the particular objective desired.

To avoid unnecessary complications it is preferable to use unextended dyestuffs as starting materials. It is common practice in the dyestuffs art to standardize colors with sodium sulfate or similar agents and to rosinate various lakes. While these added agents do not prevent operation of the process of this invention, they introduce added factors which are best avoided if the unmodified azo dyestuff is available.

Some minor variations in shade, tinctorial strength and particle size of the modified pigments can be obtained through adjustment of the drowning conditions and methods. High temperature drying of modified pigments contaminated with sulfuric acid is to be avoided since this normally results in an increase in the particle size of the color with a resultant loss in tinctorial strength.

The process of modification with formaldehyde, that is condensation, according to this invention has no intrinsic connection with sulfonation. Although normally the conditions of this process do not produce sulfonated products, it has been found that certain specific samples of the preferred class of pigments are particularly sensitive to the action of sulfuric acid alone. Such products may simultaneously undergo incidental sulfonation as well as condensation with formaldehyde in accordance with the process of this invention.

The modified azo pigments of this invention can be employed in whatever applications the unmodified azo compounds find use. The products of this invention offer particular advantage in these applications in that they are deepened in shade and also show markedly less tendency toward bleeding or volatization.

As many apparently widely different embodiments of this invention may be made without departing from the spirit and scope thereof, it is to be understood that the invention is not limited to the specific embodiments thereof except as defined in the appended claims.

I claim:

1. A process for preparing a modified azo dyestuff which comprises dissolving in strong sulfuric acid of at least 80% concentration, at a temperature of from 10° to 50° C., an azo dyestuff containing at least one azo group which is a substituent in an aromatic ring having at least one nuclear hydrogen and at least one hydroxyl group, adding thereto per mole of said azo dyestuff from 0.5 to 5 moles of a member selected from the class consisting of formaldehyde and substances generating formaldehyde, and subsequently drowning the reaction mixture in water.

2. A process for preparing a modified azo dyestuff as set forth in claim 1 in which said sulfuric acid is in about 96% concentration.

3. A process for preparing a modified azo dyestuff which comprises dissolving in strong sulfuric acid of at least 80% concentration, at a temperature of from 15° to 35° C., an azo dyestuff containing at least one azo group which is a substituent in an aromatic ring having at least one nuclear hydrogen and at least one hydroxyl group, adding thereto per mole of said azo dyestuff from 1 to 2 moles of a member selected from the class consisting of formaldehyde and substances generating formaldehyde, and subsequently drowning the reaction mixture in water.

4. A process for preparing a modified azo dyestuff as set forth in claim 3 in which said sulfuric acid is in about 96% concentration.

5. A process for preparing a modified azo dyestuff which comprises dissolving in strong sulfuric acid of at least 80% concentration, at a temperature of from 10° to 50° C., an azo pigment dyestuff containing at least one azo group which is a substituent in an aromatic ring having at least one nuclear hydrogen and at least one hydroxyl group, adding thereto per mole of said azo dyestuff from 0.5 to 5 moles of a member selected from the class consisting of formaldehyde and substances generating formaldehyde, and subsequently drowning the reaction mixture in water.

6. A process for preparing a modified azo dyestuff which comprises dissolving in strong sulfuric acid of at least 80% concentration, at a temperature of from 10° to 50° C., an azo dyestuff containing at least one azo group which is a substituent in an aromatic ring having at least one nuclear hydrogen and at least one hydroxyl group, adding thereto per mole of said azo dyestuff from 0.5 to 5 moles of paraformaldehyde, and subsequently drowning the reaction mixture in water.

7. A process for preparing a modified azo dyestuff which comprises dissolving in strong sulfuric acid of at least 80% concentration, at a temperature of from 10° to 50° C., an azo dyestuff containing at least one azo group which is a substituent in an aromatic ring having at least one nuclear hydrogen and at least one hydroxyl group, adding thereto per mole of said azo dyestuff from 0.5 to 5 moles of a member selected from the class consisting of formaldehyde and substances generating formaldehyde, the reaction mixture containing not more than 25% polar organic solvent by weight, and subsequently drowning the reaction mixture in water.

8. A process for preparing a modified azo dyestuff which comprises dissolving in strong sulfuric acid of at least 80% concentration, at a temperature of from 10° to 50° C., an azo dyestuff containing at least one azo group which is a substituent in an aromatic ring having at least one nuclear hydrogen and at least one hydroxyl group, adding thereto per mole of said azo dyestuff from 0.5 to 5 moles of a member selected from the class consisting of formaldehyde and substances generating formaldehyde, then adding to the reaction mixture an adjuvant agent consisting of 2-hydroxy-3-naphtho-o-toluide to limit the modification of said azo dyestuff, and subsequently drowning the reaction mixture in water.

9. A process for preparing a modified azo dyestuff which comprises dissolving in strong sulfuric acid of at least 80% concentration, at a temperature of from 10° to 50° C., an azo dyestuff containing a 2-hydroxy-3-naphthoic acid nucleus, adding thereto per mole of said azo dyestuff from 0.5 to 5 moles of a member selected from the class consisting of formaldehyde and substances generating formaldehyde, and subsequently drowning the reaction mixture in water.

10. A process for preparing a modified azo dyestuff which comprises dissolving in strong sulfuric acid of at least 80% concentration, at a temperature of from 10° to 50° C., an azo dyestuff containing a 2-hydroxy-3-naphtharylide nucleus, adding thereto per mole of said azo dyestuff from 0.5 to 5 moles of a member selected from the class consisting of formaldehyde and substances generating formaldehyde, and subsequently drowning at reaction mixture in water.

11. A process for preparing a modified azo dyestuff which comprises dissolving in strong sulfuric acid of at least 80% concentration, at a temperature of from 10° to 50° C., an azo dyestuff containing a 2-naphthol nucleus, adding thereto per mole of said azo dyestuff from 0.5 to 5 moles of a member selected from the class consisting of formaldehyde and substances generating formaldehyde, and subsequently drowning the reaction mixture in water.

12. A process for preparing a modified azo dyestuff which comprises dissolving in strong sulfuric acid of at least 80% concentration, at a temperature of from 10° to 50° C., the azo dyestuff 1-(2,5-dichlorophenylazo) - 2 - hydroxy-3-naphtho-o-toluide, adding thereto per mole of said azo dyestuff from 0.5 to 5 moles of paraformaldehyde, and subsequently drowning the reaction mixture in water.

13. A modified azo dyestuff obtained by dissolving in strong sulfuric acid of at least 80% concentration, at a temperature of from 10° to 50° C., an azo dyestuff containing at least one azo group which is a substituent in an aromatic ring having at least one nuclear hydrogen and at least one hydroxyl group, adding thereto per mole of said azo dyestuff from 0.5 to 5 moles of a member selected from the class consisting of formaldehyde and substances generating formaldehyde, and subsequently drowning the reaction mixture in water thereby precipitating said modified azo dyestuff.

14. A modified azo pigment dyestuff obtained by dissolving in strong sulfuric acid of at least 80% concentration, at a temperature of from 10° to 50° C., an azo pigment dyestuff containing at least one azo group which is a substituent in an aromatic ring having at least one nuclear hydrogen and at least one hydroxyl group, adding thereto per mole of said azo dyestuff from 0.5 to 5 moles of a member selected from the class consisting of formaldehyde and substances generating formaldehyde, and subsequently drowning the reaction mixture in water thereby precipitating said modified azo pigment dyestuff.

15. A modified azo dyestuff obtained by dissolving in strong sulfuric acid of at least 80% concentration, at a temperature of from 10° to 50° C., an azo dyestuff containing a 2-hydroxy-3-naphthoic acid nucleus, adding thereto per mole of said azo dyestuff from 0.5 to 5 moles of a member selected from the class consisting of formaldehyde and substances generating formaldehyde, and subsequently drowning the reaction mixture in water thereby precipitating said modified azo dyestuff.

16. A modified azo dyestuff obtained by dissolving in strong sulfuric acid of at least 80% concentration, at a temperature of from 10° to 50° C., an azo dyestuff containing a 2-hydroxy-3-naphtharylide nucleus, adding thereto per mole of said azo dyestuff from 0.5 to 5 moles of a member selected from the class consisting of formaldehyde and substances generating formaldehyde, and subsequently drowning the reaction mixture in water thereby precipitating said modified azo dyestuff.

17. A modified azo dyestuff obtained by dissolving in strong sulfuric acid of at least 80% concentration, at a temperature of from 10° to 50° C., an azo dyestuff containing a 2-naphthol nucleus, adding thereto per mole of said azo dyestuff from 0.5 to 5 moles of a member selected from the class consisting of formaldehyde and substances generating formaldehyde, and subsequently drowning the reaction mixture in water thereby precipitating said modified azo dyestuff.

PAUL ARTHUR, JR.

REFERENCES CITED

The following references are of record in the file of this patent:

UNITED STATES PATENTS

| Number | Name | Date |
|---|---|---|
| Re. 19,527 | Laska et al. | Apr. 9, 1935 |
| 1,122,564 | Zitscher et al. | Dec. 29, 1914 |
| 1,707,181 | Weiler et al. | Mar. 26, 1929 |
| 2,063,631 | Schmidt et al. | Dec. 8, 1936 |
| 2,204,230 | Rossander et al. | June 11, 1940 |
| 2,212,956 | Siegel | Aug. 27, 1940 |
| 2,334,408 | Gump et al. | Nov. 16, 1943 |

FOREIGN PATENTS

| Number | Country | Date |
|---|---|---|
| 4,648 | Great Britain | 1911 |
| 3,313 | Great Britain | of 1914 |